United States Patent [19]
Budzich

[11] 4,199,944
[45] Apr. 29, 1980

[54] LOAD RESPONSIVE SYSTEM PUMP CONTROLS

[76] Inventor: Tadeusz Budzich, 80 Murwood Dr., Moreland Hills, Ohio 44022

[21] Appl. No.: 2,844

[22] Filed: Jan. 11, 1979

Related U.S. Application Data

[63] Continuation-in-part of Ser. No. 835,999, Sep. 23, 1977, Pat. No. 4,139,987.

[51] Int. Cl.² .............................................. F16H 39/46
[52] U.S. Cl. ........................................ 60/445; 60/451; 60/452; 60/DIG. 2
[58] Field of Search .................. 60/445, 451, 452, 464, 60/478, DIG. 2; 91/446, 459

[56] References Cited

U.S. PATENT DOCUMENTS 4,139,987  2/1979  Budzich .................................. 60/445

Primary Examiner—Edgar W. Geoghegan

[57] ABSTRACT

A load responsive fluid power control system using servo type flow control valves and fluid motors supplied by a variable displacement pump. The pump displacement is either regulated by an electro-hydraulic control valve in response to an electrical signal proportional to motor load or the pump displacement is regulated to maintain a constant discharge pressure. The flow of pressurized fluid from the pump is automatically cut off from a servo type valve controlling a negative or aiding load once this load exceeds a certain minimum level and the inlet flow requirement of the actuator is supplied from a low pressure source bypassing the servo valve.

10 Claims, 5 Drawing Figures

LOAD RESPONSIVE SYSTEM PUMP CONTROLS

This is a continuation in part of application Ser. No. 835,999 filed Sept. 23, 1977 now U.S. Pat. No. 4,139,987, issued Feb. 20, 1979, for "Load Responsive System Pump Controls".

BACKGROUND OF THE INVENTION

This invention relates generally to load responsive fluid power system or a constant pressure fluid power system using a servo valve in control of a fluid motor driving a load and operated by a variable displacement pump.

In more particular aspects this invention relates to a fluid power system using a variable displacement pump and servo valves in control of loads, in which the flow of pressurized fluid is automatically cut off from the servo valve controlling a negative or aiding load.

In still more particular aspects this invention relates to a system, in which the inlet flow requirements of an actuator controlling a negative or aiding type load are directly supplied from a low pressure source to the actuator, bypassing the servo valve.

Load responsive or constant pressure fluid power and control systems are very desirable for a number of reasons. They permit simultaneous control of multiple loads from one pressure source with high system gain. Normally the servo valves of such a system connect the actuator inlet with the fluid at high pressure level, while controlling a negative load. This results in a very large throttling loss across the controlling orifices of the servo valve, reducing the system efficiency and providing additional parasitic side effects.

SUMMARY OF THE INVENTION

It is therefore a principal object of this invention to provide a load responsive or constant pressure fluid control system, in which the high pressure pump flow is automatically cut off from the actuator controlling a negative load and the inlet flow requirements of the actuator supplied to the actuator inlet, directly from a low pressure source, bypassing one of the throttling orifices of the servo valve.

Briefly the foregoing and other additional objects and advantages of this invention are accomplished by providing a novel load responsive or constant pressure fluid control system for use during control of multiple loads by servo valves. High system efficiency is ensured by interrupting the flow of pressurized fluid from the system pump to the servo valve controlling a negative load of sufficient magnitude to ensure response of the system, while the source of high pressure fluid is isolated from the actuator sustaining a negative load, its inlet flow requirements being directly supplied from a low pressure source bypassing one of the throttling orifices of the servo valve. In this way not only the amount of pressure energy converted by throttling in servo valve into heat is greatly reduced, but the servo valve itself is subjected to reduced pressure drop. Also no flow from the pump is used during control of negative load, thus increasing the capacity of the pump to perform useful work.

Additional objects of this invention will become apparent when referring to the preferred embodiments of the invention as shown in the accompanying drawings and described in the following detailed description.

DESCRIPTION OF THE PREFERRED EMBODIMENTS

Figure 1:
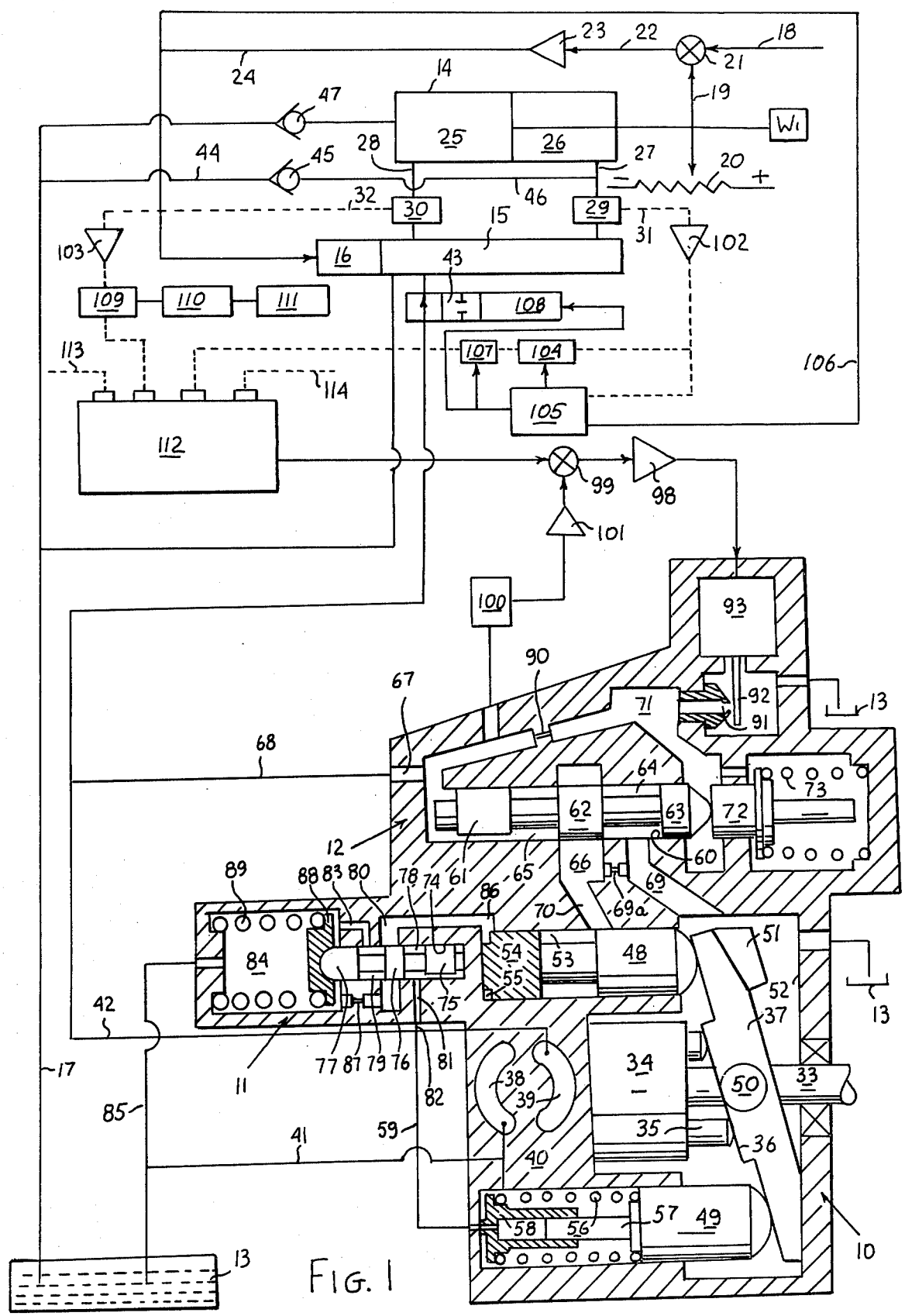
FIG. 1 is schematic circuit diagram of a multiple load system using servo valves with pump control responding to the highest system load, while the load signals are transmitted electrically.

Referring now to the drawings and for the present to FIG. 1 an embodiment of diagramatically shown variable displacement pump, generally designated as 10 and its controls, generally designated as 11 and 12, is interposed between a system reservoir 13 and system motors controlled by system valves. The variable displacement pump 10 may be of an axial piston type, as shown in FIG. 1, or radial piston type, or vane type, or any other type in which the volume of fluid output per one revolution of the pump can be regulated. Although in the preferred embodiments the system pump is shown as a variable displacement type, a fixed displacement pump, with output flow control of a bypass type, well known in the art, could be used, the pump bypass mechanism being then operated by the pump controls instead of by the variable displacement mechanism of a variable displacement pump.

A fluid motor 14, operating a load $W_1$, is controlled by an electro-hydraulic servo valve 15, controlled by a torque motor 16, well known in the art. Servo valve 15 is connected to reservoir 13 by exhaust line 17. In a well known manner an electrical command signal 18 and a position feedback signal 19 from a position transducer 20 are substracted from each other in a differential 21, producing a position error signal 22, which is supplied to a servo amplifier 23, which supplies through line 24 position error signal current to the toque motor 16, thus closing the control loop. Load pressures from the motor chambers 25 and 26 are transmitted through lines 27 and 28 to pressure transducers 29 and 30. Electrical signals proportional to pressure in chambers 25 and 26 are generated by pressure transducers 29 and 30 and supplied through lines 31 and 32 to the electrical network of system controls. The variable displacement pump 10 is driven by a shaft 33, from a prime mover not shown, revolving a cylinder barrel 34, slidably guiding pistons 35, which abut against inclined surface 36 of a swash plate 37. Rotation of the cylinder barrel 34 will induce a reciprocating motion in pistons 35 maintained against inclined surface 36, which will result in a fluid transfer from low pressure port 38 to high pressure port 39, of a diagramatically shown valve plate 40. Low pressure port 38 is connected through suction line 41 with the system reservoir 13. High pressure port 39 is connected through discharge line 42 and electrically operated on-off valve 43 with the servo valve 15. The exhaust line 17 is connected through line 44, check valve 45 and line 46 to line 27 leading to motor chamber 26. The exhaust line 17 is also connected through check valve 47 to the motor chamber 25. The swash plate 37 of the variable displacement pump 10 is subjected to forces of a first actuating piston 48 and a second actuating piston 49 and pivots around a pin 50, regulating the output of high pressure fluid from the pump by change in the angle of inclination of the swash plate 37, in respect to the axis of rotation of the cylinder barrel 34. With a stop 51 engaging surface 52 the swash plate 37 assumes a vertical position corresponding to a zero pump discharge flow. The first actuating piston 48 is subjected to pressure in space 53 and to force developed on area of a transfer piston 54 by pressure in space 55 in a direction to decrease flow output from the pump. The second actuating piston 49 is subjected to the biasing force of a spring 56 and force developed on the cross-sectional area of piston 57 by pump discharge pressure transmitted to a reaction cylinder 58. The reaction cylinder 58 is connected with discharge line 42 by line 59.

The pump control 12 is provided with bore 60 axially guiding a pilot valve spool 61. The pilot valve spool 61, shown in FIG. 1 in a modulating position, has a metering land 62 and a land 63 defining annular spaces 64 and 65. Bore 60 is provided with annular space 66. Annular space 65 is connected through port 67 and line 68 with discharge line 42 and therefore is subjected to discharge pressure of the pump 10. Annular space 64 is connected through port 69 with the system reservoir 13. Leakage orifice 69a interconnects annular space 66 with port 69. Annular space 66 is connected through passage 70 with space 53. The land 63 with its spherical end projects into pressure chamber 71 and engages piston 72, subjected to biasing force of a load spring 73. Position of metering land 62 regulates pressure in annular space 66 and space 53 generating force on actuating piston 48 which rotates swash plate 37.

The pump control 11 is provided with bore 74 axially guiding a pilot valve spool 75. The pilot valve spool 75, shown in FIG. 1 in an unloading position, has a metering land 76 and a land 77 defining annular spaces 78 and 79. Bore 74 is provided with annular space 80. Annular space 78 is connected through port 81 and line 82 to discharge line 42 and therefore is subjected to discharge pressure of the pump 10. Annular space 79 is connected through passage 83 with space 84, which in turn is connected through line 85 to the system reservoir 13. Annular space 80 is connected through passage 86 with space 55 and through the leakage orifice 87 to space 84. The land 77 with its spherical end projects into space 84 and engages the spring retainer 88, subjected to biasing force of a maximum pressure spring 89.

The variable displacement pump 10, in a well known manner, by changing the angular inclination of the swash plate 37 will proportionally regulate the flow of fluid from low pressure port 38 to high pressure port 39. Low pressure port 38 is connected by suction line 41 to the reservoir 13. High pressure discharge fluid is supplied from high pressure port 39 through discharge line 42 to the fluid power and control system as shown in FIG. 1. The swash plate 37 is biased towards position of its maximum angular inclination and therefore towards position of maximum flow output of the variable displacement pump 10 by the second actuating piston 49, which is subjected to force of the spring 56 and force developed on cross-sectional area of piston 57, by the pressure existing in discharge line 42. The swash plate 37 is biased towards the position of its minimum angular inclination and therefore towards position of minimum flow output of the variable displacement pump 10 by the first actuating piston 48. The first actuating piston 48 is subjected to force developed on its cross-sectional area by pressure in space 53, or through the action of the transfer piston 54 to the force developed on its cross-sectional area by pressure in space 55. In a well known manner the force generated by the higher of the two pressures, existing in spaces 53 and 55, will be transmitted by the first actuating piston 48 to the swash plate 37. Therefore by regulating the pressure level in spaces 53 and 55, the angular inclination of the swash plate 37 and therefore the discharge flow of the variable displacement pump 10 can be controlled. Since the pressure level in space 53 is dictated by the pump control 12 and the pressure level in space 55 is dictated by the pump control 11, displacement and output flow of the variable displacement pump 10 can be varied in response to the control pressure transmitted either from the pump control 12 or the pump control 11.

The pump control 11 limits through the control of the angle of inclination of the swash plate 37 the maximum system pressure to a fixed predetermined level and represents a type of control well known in the art as pressure compensator. Assume that the pressure in space 53 is maintained by the pump control 12 at a low level. The pilot valve spool 75, of the pump control 11, is subjected to the force generated by pressure in annular space 78, acting on its cross-sectional area, tending to move it from right to left and the biasing force of the maximum pressure spring 89 tending to move it from left to right. Since annular space 78 is directly connected through port 81 with the pump discharge pressure and since space 84 containing the maximum pressure spring 89 is maintained through line 85 at reservoir pressure, the force generated by the pump discharge pressure on the cross-sectional area of the pilot wave spool 75 will overcome the preload in the maximum pressure spring 89 and move the pilot valve spool 75 from right to left. The preload in the maximum pressure spring 89 is so selected that it corresponds to the maximum system pressure to which the system can be subjected. As shown in FIG. 1 the pilot valve spool 75 is maintained by the maximum pressure spring 89 in its extreme position to the right, connecting space 55 through passage 86, annular space 80, annular space 79, passage 83, space 84 and line 85 with the system reservoir 13. Therefore the swash plate 37 will remain biased by the second actuating piston 49 at its maximum angular inclination, the variable displacement pump 10 delivering maximum flow to the system. Assume that the pump discharge pressure will increase gradually until it will reach a level, at which, acting on the cross-sectional area of the pilot valve spool 75 it will move the pilot valve spool 75 from right to left against the biasing force of the maximum pressure spring 89, first closing with the metering land 76 communication between annular space 79 and annular space 80 and then gradually connecting annular space 80 with annular space 78, which is subjected to the discharge pressure of the variable displacement pump 10. The pressure in annular space 80, passage 86 and space 55 will increase to a level at which, acting on the cross-sectional area of the transfer piston 54, it will move the transfer piston 54 and the first actuating piston 48 against the force, developed by the second actuating piston 49, redcuing the angular inclination of the swash plate 37 and discharge flow of the variable displacement pump 10, to a level, at which the discharge pressure will begin to drop. The pilot valve spool 75 will then move from left to right into a modulating position, in which the metering land 76, in a well known manner, will vary the pressure in space 55, to vary the angular inclination of the swash plate 37, to vary the discharge flow of the variable displacement pump 10, to maintain the maximum discharge pressure of the pump 10 at a constant level, as dictated by the preload in the maximum pressure spring 89. Since a small leakage flow, proportional to pressure in space 55, is induced by the leakage orifice 87 between annular space 80 and space 84, the metering land 76 will assume a modulating position, throttling fluid flow from annular space 78 to annular space 80 and space 55, to vary the flow of the variable displacement pump 10, to maintain the system pressure at a constant maximum pressure level. The leakage orifice 87 is usually introduced to increase control stability. In the intermediate pump discharge pressure range of the variable displacement pump 10, lower than the maximum system pressure, as determined by the preload in the maximum pressure spring 89, the pump control 11 is completely inactive, maintaining the pressure in space 55 at reservoir pressure, permitting operation of the pump control 12. Once, however, the system pressure as dictated by the pump control 12, reaches the maximum pressure control setting of the pump control 11, the pump control 11 automatically takes over, varying the displacement of the variable displacement pump 10, to maintain system pressure at this maximum level, until the pump control 12, lowers the system pressure to a level, below pressure setting of the pump control 11, at which time the pump control 11 becomes inactive and system pressure is controlled by the pump control 12.

Pump control 12 is a variation of an electro-hydraulic servo valve, well known in the art, which takes a low energy electrical input and translates it into high energy hydraulic output. Some early designs used an electric torque motor armature, directly connected to a spool of a hydraulic valve and supplied all power to move it. Such a valve is called a single stage valve in contrast to later developments, which added a second stage of hydraulic amplification, or socalled pilot operation. Various designs can be used for the second stage. Cascading a larger second stage spool valve with the first stage of amplification gives higher power levels. Feedback, well known in the art, keeps output flow or pressure proportional to input signal. A two stage servo valve development, that gained wide acceptance, is the combination of first stage using a nozzle-flapper combination, as a hydraulic amplifier and a spool output stage. An electrical input signal into torque motor produces a proportional output pressure from the first stage hydraulic amplifier. This pressure is used to drive the output spool. Such a first stage hydraulic amplifier is used in the servo pump control 12. The first stage has a fixed upstream orifice 90 connected through port 67 and lines 68 and 42 to the high pressure port 39 of the variable displacement pump 10 which provides the source of pressure and a nozzle type down stream orifice 91, resistance of which is varied by position of a flapper 92 in relation to the nozzle orifice 91. The flapper 92 is operated by a torque motor 93 which usually consits of a polarized solenoid energized by a coil. The pressure in chamber 71, positioned between the upstream orifice 90 and the nozzle orifice 91, which are in series, is applied to one end of the pilot valve spool 61. The servo valve can have a single nozzle flapper hydraulic amplifier of an unbalanced type, in which first stage pressure is ported to one end of the output spool. Such a servo valve is shown in FIG. 1, operating through the pilot valve spool 61 the flow changing mechanism or the swash plate 37 of the variable displacement pump 10. Double nozzle balanced type servo valves have two sets of opposing orifices and nozzles and transmit first stage amplified pressure signal to both ends of the output spool.

The pilot valve 61 is subjected on one side to the pressure developed in chamber 71 and to biasing force of the spring 73, transmitted through a piston 72. With pressure in chamber 71 at a very low level, corresponding to a very low control signal to torque motor 93, the pilot valve spool 61, biased by the spring 73, will perform as a conventional pressure compensator control, automatically maintaining constant preselectable minimum pressure in chamber 71 and therefore in pump discharge port 39, by varying the displacement of the variable displacement pump 10. This minimum pressure level is dictated by preload in spring 73. Rising pressure in chamber 71 will react on cross-sectional area of the pilot valve spool 61, tending to increase the system pressure. A further increase in the pressure in chamber 71, in a manner as previously described, will automatically increase, by an equal amount, the discharge pressure level of the variable displacement pump 10, by regulating output flow of the pump.

The control signal from the electrical network is supplied to servo amplifier 98. Servo amplifier, well known in the art, usually includes a command and feedback signal differential 99, feeding an error signal, which is equal to the difference between command and feedback signals, into forward path amplifier, which provides torque motor control current to the torque motor 93. Feedback pressure signal of pump discharge pressure, sensed by the pressure transducer 100 and amplified by the signal amplifier 101, is supplied to the differential 99. Therefore in a well known manner control signal, proportional to the difference between signal transmitted from electricl netowrk and feedback signal, which constitutes an error signal, is supplied from the servo amplifier 98 to the torque motor 93. In a manner as previously described the flapper 92 will vary pressure in chamber 71, in respect to the error signal supplied from the servo amplifier 98. Therefore pump control 12 will automatically vary the flow of variable displacement pump 10 to maintain its discharge pressure at a level as dictated by the control signal transmitted from the electrical network to the servo amplifier 98.

Pressure transducer, well known in the art, is a device which converts pressure signal into a proportional electrical signal, usually providing an output voltage proportional to system pressure. Such transducers 29 and 30 are shown in FIG. 1. Pressure transducers use many types of transducing elements, strain gauge being one of them and can provide not only a signal proportional to direct pressure, but also a signal proportional to differential pressure. Differential pressure transducer, providing a signal proportional to differential pressure across an actuator, will also provide a signal, which is proportional to system load, being operated by the actuator. Load signal can also be obtained, as is well known in the art, by a load cell, which directly reacts to the loads developed by the actuator.

An electrical signal, proportional to system load or pressure, is supplied to signal amplifiers 102 and 103. Signal amplifiers are instrument type of operational amplifiers, well known in the art, which amplify a relatively weak electrical control signal, by a fixed preselectable ratio, into a proportional higher strength signal. Low strength electrical control signal is usually in the form of variable voltage. Those amplifiers, at different preselectable ratios of amplification, amplify electrical signals, proportional to load or pressure, from different types of pressure or load transducers.

Electrical signal, in the form of voltage proportional to pressure, is transmitted through signal amplifier 102 to a summing network 104. The electrical circuits, which perform the summation of two or more voltages, can be implemented by a number of methods. Discreet elements resistors, capacitors, transistors etc. can be used. The use of summation amplifiers in circuits, which perform mathematical operations such as addition is well known. Therefore summing network, composed of components well known in the art, can continuously add constant or variable voltage to the variable output signals, supplied from the pressure transducer. The electrical summing network 104 receives a variable voltage input from a first computing device 105, which is schematically illustrated in greater detail in FIG. 3. The first computing device 105 receives a load pressure signal from the transducer 29 and a position error signal through line 106 and delivers an actuating signal to a normally open on-off switch 107 and to a torque motor 108, of the electrically operated on-off valve 43.

In a similar manner the electrical control signal from transducer 30, passed through signal amplifier 103, is delivered to summing network 109, which receives a signal from a source of variable voltage 110, the voltage level of which is varied by signal from a second computing device 111.

Electrical signals from summing networks 104 and 109 are transmitted to logic circuit 112, which also through signal lines 113 and 114 receives signals from the other summing networks not shown. The logic circuit 112, or logic comparator system, which by using signal comparators and gates, well known in the art, compares the strength of all incoming command signals and permits only the highest of those signals to pass through. Such a logic circuit should be assembled from many types of components well known in the art and can be made to operate with weak command signals, in micro-volt range, or with higher strength or amplified signals. The highest amplified signal from the logic circuits 112 is supplied to a servo amplifier 98. Therefore the fluid power and electrical control system of FIG. 1 will maintain a discharge pressure from the variable displacement pump 10 at a level higher, by a certain pressure differential, than the highest load pressure developed by any of the system loads. The level of this pressure differential, in a manner as previously described, is determined by the first and second computing devices 105 and 111, dictating the voltage supplied to the summing networks 104 and 109.

Figure 2:
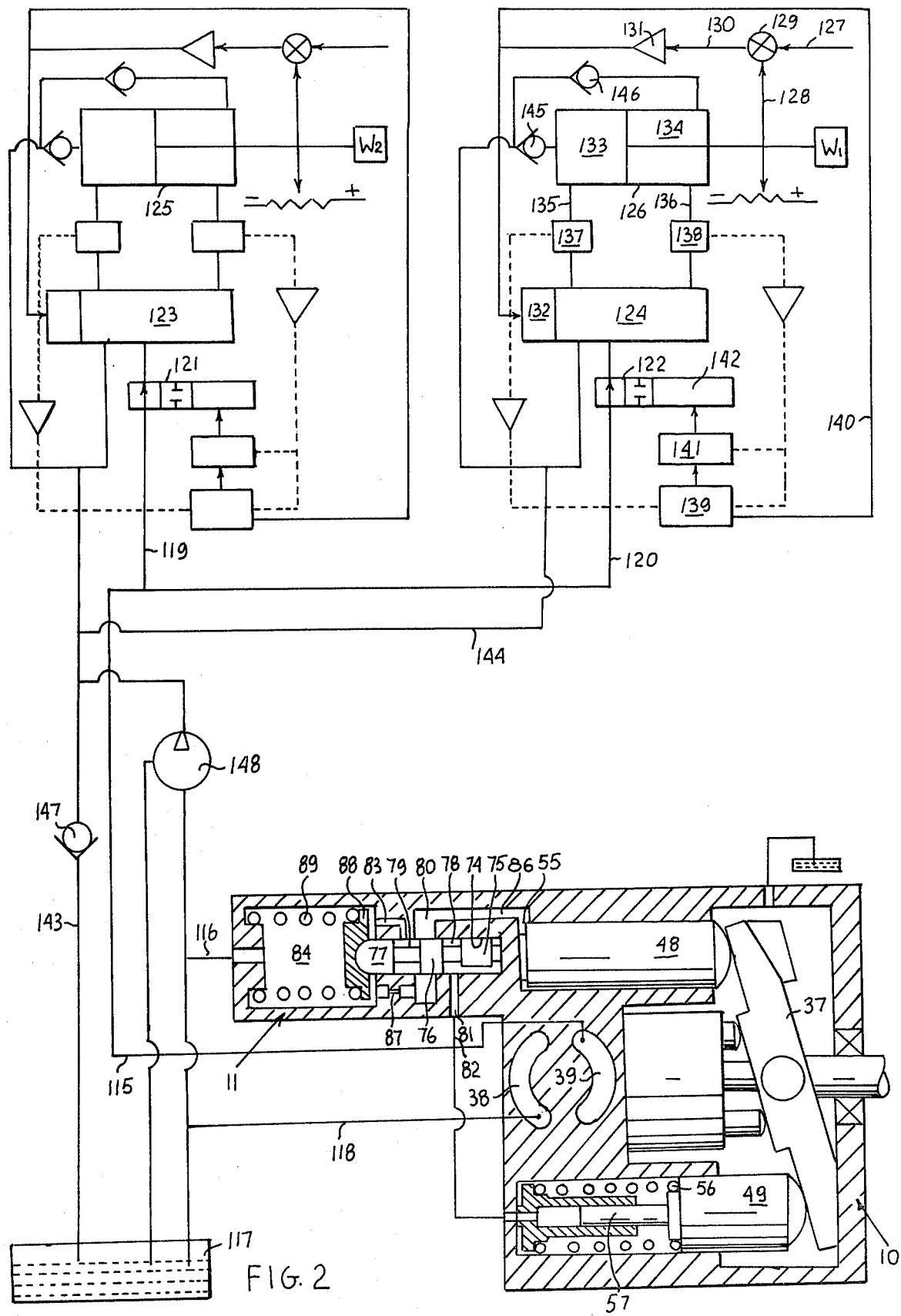
FIG. 2 is a schematic circuit diagram of an embodiment of a multiple load system using servo valves in control of loads with system pump automatically maintaining constant system pressure.

Referring now to FIG. 2 the pump control 11, of a variable displacement pump 10, similar to that as shown in FIG. 1 is provided with bore 74, axially guiding a pilot valve spool 75. The pilot valve spool 75, shown in FIG. 2, in an unloading position, has a metering land 76 and a land 77 defining annular spaces 78 and 79. Bore 74 is provided with annular space 80. Annular space 78 is connected through port 81 and line 82 to discharge line 115 and therefore is subjected to discharge pressure of the pump 10. Annular space 79 is connected through passage 83 with space 84, which in turn is connected through line 116 to the system reservoir 117. Annular space 80 is connected through passage 86 with space 55 and through leakage orifice 87 to space 84. The land 77 with its spherical end projects into space 84 and engages the spring retainer 88, subjected to biasing force of a control pressure spring 89.

The variable displacement pump 10, in a well known manner, by changing the angular inclination of the swash plate 37 will proportionally regulate the flow of fluid from low pressure port 38 to high pressure port 39. Low pressure port 38 is connected by suction line 118 to the reservoir 117. High pressure discharge fluid is supplied from high pressure port 39 through discharge line 115 to the fluid power and control system as shown in FIG. 2. The swash plate 37 is biased towards position of its maximum angular inclination and therefore towards position of maximum flow output of the variable displacement pump 10 by the second actuating piston 49, which is subjected to force of the spring 56 and force developed on cross-sectional area of piston 57 by the pressure existing in discharge line 115 through line 82. The swash plate 37 is biased towards the position of its minimum angular inclination and therefore towards position of minimum flow output of the variable displacement pump 10 by the first actuating piston 48. The first actuating piston 48 is subjected to force developed on its cross-sectional area by pressure in space 55. In a well known manner the force generated by the pressure existing in space 55, will be transmitted by the first actuating piston 48 to the swash plate 37. Therefore by regulating the pressure level in space 55, the angular inclination of the swash plate 37 and therefore the discharge flow of the variable displacement pump 10 can be controlled. Since the pressure level in space 55 is dictated by the pump control 11, displacement and output flow of the variable displacement pump 10 can be varied in response to the control pressure transmitted from the pump control 11.

The pump control 11 limits through the control of the angle of inclination of the swash plate 37 the maximum system pressure to a fixed predetermined level and represents a type of control well known in the art as pressure compensator. The pilot valve spool 75, of the pump control 11, is subjected to the force generated by pressure in annular space 78, acting on its cross-sectional area, tending to move it from right to left and the biasing force of the control pressure spring 89 tending to move it from left to right. Since annular space 78 is directly connected through port 81 and line 82 and 115 with the pump discharge pressure and since space 84 containing the control pressure spring 89 is maintained through line 116 at reservoir pressure, the force generated by the pump discharge pressure on the cross-sectional area of the pilot valve spool 75 will overcome the preload in the control pressure spring 89 and move the pilot valve spool 75 from right to left. The preload in the control pressure spring 89 is so selected that it corresponds to the desired controlled system pressure. As shown in FIG. 2 the pilot valve spool 75 is maintained by the maximum pressure spring 89 in its extreme position to the right, connecting space 55 through passage 86, annular space 80, annular space 79, passage 83, space 84 and line 116 with the system reservoir 117. Therefore the swash plate 37 will remain biased by the second actuating piston 49 at its maximum angular inclination, the variable displacement pump 10 delivering maximum flow to the system. Assume that the pump discharge pressure will increase gradually until it will reach a level, at which, acting on the cross-sectional area of the pilot valve spool 75 it will move the pilot valve spool 75 from right to left against the biasing force of the control pressure spring 89, first closing with the metering land 76 communication between annular space 79 and annular space 80 and then gradually connecting annular space 80 with annular space 78, which is subjected to the discharge pressure of the variable displacement pump 10. The pressure in annular space 80, passage 86 and space 55 will increase to a level at which, acting on the cross-sectional area of the first actuating piston 48 will move the first actuating piston 48 against the force developed by the second actuating piston 49, reducing the angular inclination of the swash plate 37 and discharge flow of the variable displacement pump 10, to a level, at which the discharge pressure will begin to drop. The pilot valve spool 75 will then move from left to right into a modulating position, in which the metering land 76, in a well known manner, will vary the pressure in space 55, to vary the angular inclination of the swash plate 37, to vary the discharge flow of the variable displacement pump 10, to maintain the controlled discharge pressure of the pump 10 at a constant level, as dictated by the preload in the control pressure spring 89. Since a small leakage flow, proportional to pressure in space 55, is induced by the leakage orifice 87 between annular space 80 and space 84, the metering land 76 will assume a modulating position, throttling fluid flow from annular space 78 to annular space 80 and space 55, to vary the flow of the variable displacement pump 10, to maintain the system pressure at a constant controlled pressure level. The leakage orifice 87 is usually introduced to increase control stability.

Fluid at constant pressure is supplied from pump 10 through discharge line 115, lines 119 and 120, electrically operated on-off valves 121 and 122 and servo valves 123 and 124 to fluid actuators 125 and 126. In a well known manner an electrical command signal 127 and a position feedback signal 128 are substracted from each other in differential 129, producing a position error signal 130, which after passing through a servo amplifier 131 is supplied to a torque motor 132 of the servo valve 124. Load pressures from chambers 133 and 134, of fluid actuator 126, are supplied through lines 135 and 136 to pressure transducers 137 and 138. Electrical signals, proportional to pressure in chambers 133 and 134, are generated by pressure transducers 137 and 138 and supplied to logic circuit 139. Logic circuit 139 is also provided through line 140 with the position error signal. The logic circuit 139 determines if the load is of an aiding or opposing type and transmits the signal to logic circuit 141, which through torque motor 142 actuates the on-off valve 122 to an off position, when the load $W_1$ is of an aiding type and when this aiding load is above a certain predetermined level. Therefore, when controlling an aiding load of sufficient magnitude the servo valve 124 is isolated from the pump 10 and the inlet flow requirement of actuator 126 is supplied from the pressurized reservoir 117, through inlet lines 143 and 144 and check valves 145 and 146, thus bypassing one of the controlling orifices of the servo valve 124. Therefore during control of an aiding load, of sufficient magnitude to permit operation of the servo valve 124, the high pressure fluid from pump 10 is isolated from the actuator 126. Since the actuator inlet flow requirement, in a manner as previously described, is supplied with low pressure instead of high pressure fluid, the amount of fluid power energy converted to heat is greatly reduced and the system efficiency greatly increased. To supply the inlet flow requirements of the actuator 126, during control of an aiding load, the low pressure fluid can be supplied directly from the pressurized reservoir 117 through check valve 147, or from the low pressure pump 148, increasing the pressure level of the fluid in reservoir 117.

The actuator 125 is connected into an identical circuit as actuator 126 and performs in an identical way as described when referring to the control of load $W_1$ by actuator 126 and servo valve 124.

Figure 3:
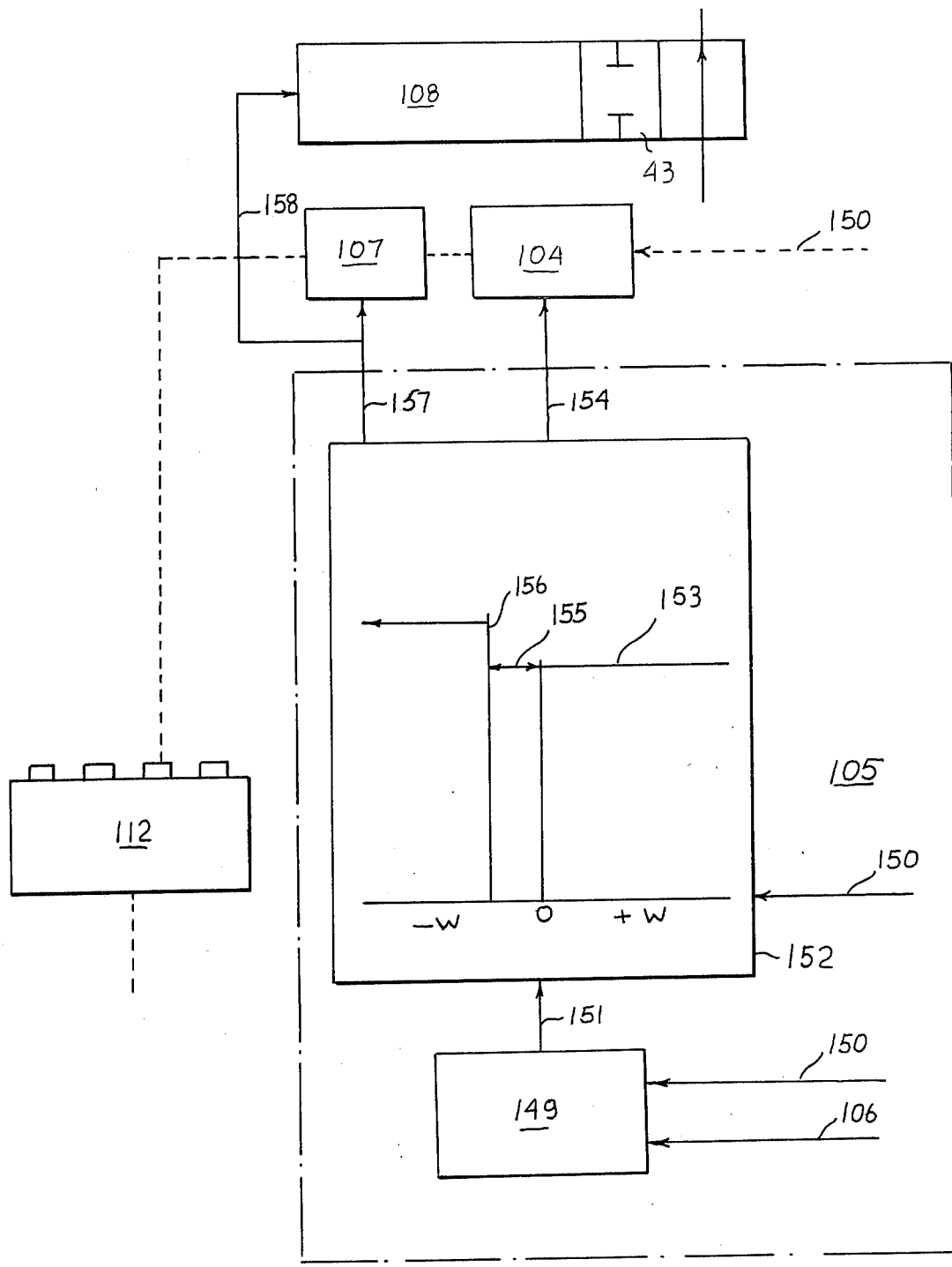
FIG. 3 is a schematic circuit diagram showing in greater detail one of the control components of FIG.1.

Referring now to FIG. 3, the first computing device 105 of FIG. 1 is shown schematically in greater detail. The first computing device 105 may contain a logic circuit 149, which from the load pressure input 150 from the system pressue transducers and position error input 106 determines if the load is aiding and negative or opposing and positive and transmits the signal 151 to the function generator 152, which is provided with an input of the load pressure 150. Function generator 152 transmits a constant or variable voltage 153 by signal 154, equivalent to the controlled system pressure differential, when the load is opposing or positive or when the load is aiding or negative, but below a certain predetermined level, as determined by pressure differential 155, to the summing network 104. When the load becomes negative and exceeds the value of pressure differential 155 at negative load pressure level 156, function generator 152 transmits a signal 157 to the on-off switch 107 and a signal 158 to the torque motor 108 of on-off valve 43. The on-off switch 107 cuts off the load signal transmitted to logic circuit 112 and torque motor 108 puts the on-off valve 43 into the off positon, isolating the source of high pressure fluid from the servo valve 15 and actuator 14, see FIG. 1. Therefore during control of positive load first computing device 105 supplies a constant or variable voltage to the summing network 104, ensuring that the controlled system pressure is higher by a controlled pressure differential than the opposing or positive load pressure. During the control of aiding or negative load higher than pressure differential 155 the first computing device 105 through on-off switch 107 stops transmittal of the negative load pressure signal to the logic circuit 112 and isolates by on-off valve 43 the servo valve 15 from the source of high pressure fluid, the inlet flow requirements of the actuator of FIG. 1 being supplied from the pressurized reservoir 13 through check valves 45 and 47, bypassing one of the control orifices of the servo valve 15. In this way none of the high pressure fluid is used during control of aiding or negative load, further increasing the system efficiency of the load responsive system of FIG. 1.

Although the preferred embodiments of this invention have been shown and described in detail it is recognized that the invention is not limited to the precise form and structure shown and various modifications and rearrangements as will occur to those skilled in the art upon full comprehension of this invention may be resorted to without departing from the scope of the invention as defined in the claims.

What is claimed is:

1. A fluid power and control system comprising a fluid pump, a fluid motor driving a load, and valve means interposed between said pump and said motor to control said load, flow changing means operable to vary fluid flow delivered from said pump to said fluid system and to control pressure in said fluid system, control signal generating means having means to generate a first electrical control signal proportional to magnitude of said load, logic means responsive to said first electrical control signal and operable to transmit a second electrical signal when said load driven by said fluid motor is of an aiding type, isolating valve means responsive to said second electrical signal and operable to isolate fluid flow from said pump to said fluid motor, a source of low pressure fluid, and fluid replenishing means operable to connect said fluid motor with said source of low pressure fluid when said isolating valve means isolates said fluid motor from said pump.

2. A fluid power and control system as set forth in claim 1 wherein control means responsive to said first electrical signal has means operable through said flow changing means to control a pressure differential between pressure of said fluid system and pressure necessary to support said load.

3. A fluid power and control system as set forth in claim 1 wherein control means has means operable through said flow changing means to maintain system pressure at a constant preselected level.

4. A fluid power and control system as set forth in claim 1 wherein said control signal generating means includes first transducer means having means to convert a mechanical force signal proportional to said load into a first proportional electrical signal.

5. A fluid power and control system as set forth in claim 1 wherein said control means has means to generate electrical signal and an electrical signal adding means to add said electrical signal to said electrical control signal proportional to magnitude of said load to produce a second electrical control signal.

6. A fluid power and control system as set forth in claim 5 wherein said means to generate electrical signal is responsive to computing means.

7. A fluid power and control system as set forth in claim 6 wherein electrical signal blocking means operable to block said second control signal from said control means has means responsive to said computing means.

8. A fluid power and control system as set forth in claim 1 wherein said logic means includes means operable to generate said second electrical signal when said load driven by said fluid motor is of an aiding type and exceeds a certain preselected minimum level.

9. A fluid power and control system as set forth in claim 1 wherein said fluid replenishing means is interposed between said fluid motor and reservoir means.

10. A fluid power and control system as set forth in claim 1 wherein said fluid replenishing means is interposed between said fluid motor and a low pressure pump.

* * * * *